US012783470B1

(12) United States Patent
Lee et al.

(10) Patent No.: US 12,783,470 B1
(45) Date of Patent: Nov. 3, 2026

(54) SCALING LOGICAL PARTITIONING WITH PHYSICAL KEY ORGANIZATION

(71) Applicant: Oracle International Corporation, Redwood Shores, CA (US)

(72) Inventors: Teck Hua Lee, San Mateo, CA (US); Yu Chieh Fu, Redmond, WA (US); Tirthankar Lahiri, Palo Alto, CA (US); Sylvia Winters, Menlo Park, CA (US); Shasank Kisan Chavan, Menlo Park, CA (US); Aurosish Mishra, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/224,247

(22) Filed: May 30, 2025

(51) Int. Cl.
*G06F 16/00* (2019.01)
*G06F 16/21* (2019.01)

(52) U.S. Cl.
CPC .................................... *G06F 16/21* (2019.01)

(58) Field of Classification Search
None
See application file for complete search history.

(56) References Cited

U.S. PATENT DOCUMENTS 8,607,122 B2 * 12/2013 Resch .................. H04L 1/0057 714/763
9,870,416 B2 * 1/2018 Ng ........................ G06F 16/278
2005/0038784 A1 2/2005 Zait et al.
2012/0254174 A1 * 10/2012 Mitra .................... G06F 12/126 707/E17.046
2020/0233721 A1 * 7/2020 Mathur ................... G06F 9/505
2024/0273077 A1 * 8/2024 Zeng ...................... G06F 16/2282

OTHER PUBLICATIONS

Oracle, "Oracle Exadata System Software", Users's Guide, available:www.docs.oracle.com/cd/F86788_01/sagug/system-software-users-guide-exadata-database-machine-sagug.pdf, Jan. 31, 2024, pp. 1-54.

* cited by examiner

*Primary Examiner* — Anhtai V Tran
(74) *Attorney, Agent, or Firm* — Hickman Becker Bingham Ledesma LLP

(57) ABSTRACT

A database dictionary at a database server defines a partition key column of a table and maps partitions to respective segments. The database dictionary maps a particular partition key value to a partition stored in a particular segment. A database statement specifies a predicate that filters based on the particular partition key value. A storage device includes a mapping that maps partition key values of the partition key column to respective subsegments. The database server prunes partitions based on the predicate to select a particular partition and sends the storage device a scan request to scan the particular segment for rows that satisfy the predicate. The storage device prunes subsegments to select a particular subsegment and returns rows from the particular subsegment as a result of the scan request.

20 Claims, 7 Drawing Sheets

SCALING LOGICAL PARTITIONING WITH PHYSICAL KEY ORGANIZATION

FIELD

The present invention relates to tables in a database and, more specifically, to scaling logical partitioning with physical key organization.

BACKGROUND

In conventional relational database tables, rows are inserted into the table without regard to any type of ordering. Consequently, when a user submits a query that selects data from the table based on a particular value or range of values, the entire table has to be scanned to ensure that all rows that satisfy the criteria are identified. Partitioning is a technique that, in certain situations, avoids the need to search an entire table (or other database object).

With partitioning, an object, such as a database table, is divided up into sub-tables, referred to as "partitions." The most common form of partitioning is referred to as range partitioning. With range partitioning, each individual partition corresponds to a particular range of values for one or more columns of the table. For example, one column of a table may store date values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where the month equals January, then only the partition associated with the month of January would have to be scanned. Other types of partitioning include hash partitioning and list-based partitioning.

When a database server receives a request to perform an operation, the database server makes a plan of how to execute the query. If the operation involves accessing a partitioned database object, part of making the plan involves determining which partitions of the partitioned object, if any, can be excluded from the plan (i.e. which partitions need not be accessed to execute the query). The process of excluding partitions from the execution plan of a query that accesses a partitioned object is referred to as partition pruning.

Partitioning requires metadata of the partitions to be stored in database catalogs, such as a database dictionary. If the number of partitions is very high (e.g., >10 million), certain operations that scale with the size of the database dictionary become very expensive. Examples of expensive operations include query compilation and cursor management. In addition, it is harder to sustain high I/O throughput without implementing tricky pre-fetching across partition boundaries.

The problem with a high number of partitions is growing worse because datasets are growing in size. The typical solution is to create even more partitions. As described above, the problem with this approach is that catalog-based operations and I/O throughput do not scale well. Examples use cases that are stressful for partitioning include high volume time series that require large number of metric sub-partitions under time range partitions, petabyte scale data lakes that a large number of file partitions to cache a subset of the data, accurate vector indexes that require large number of centroid partitions for improving recall rate, and other use cases that involve numerous partitions.

The approaches described in this section are approaches that could be pursued, but not necessarily approaches that have been previously conceived or pursued. Therefore, unless otherwise indicated, it should not be assumed that any of the approaches described in this section qualify as background merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
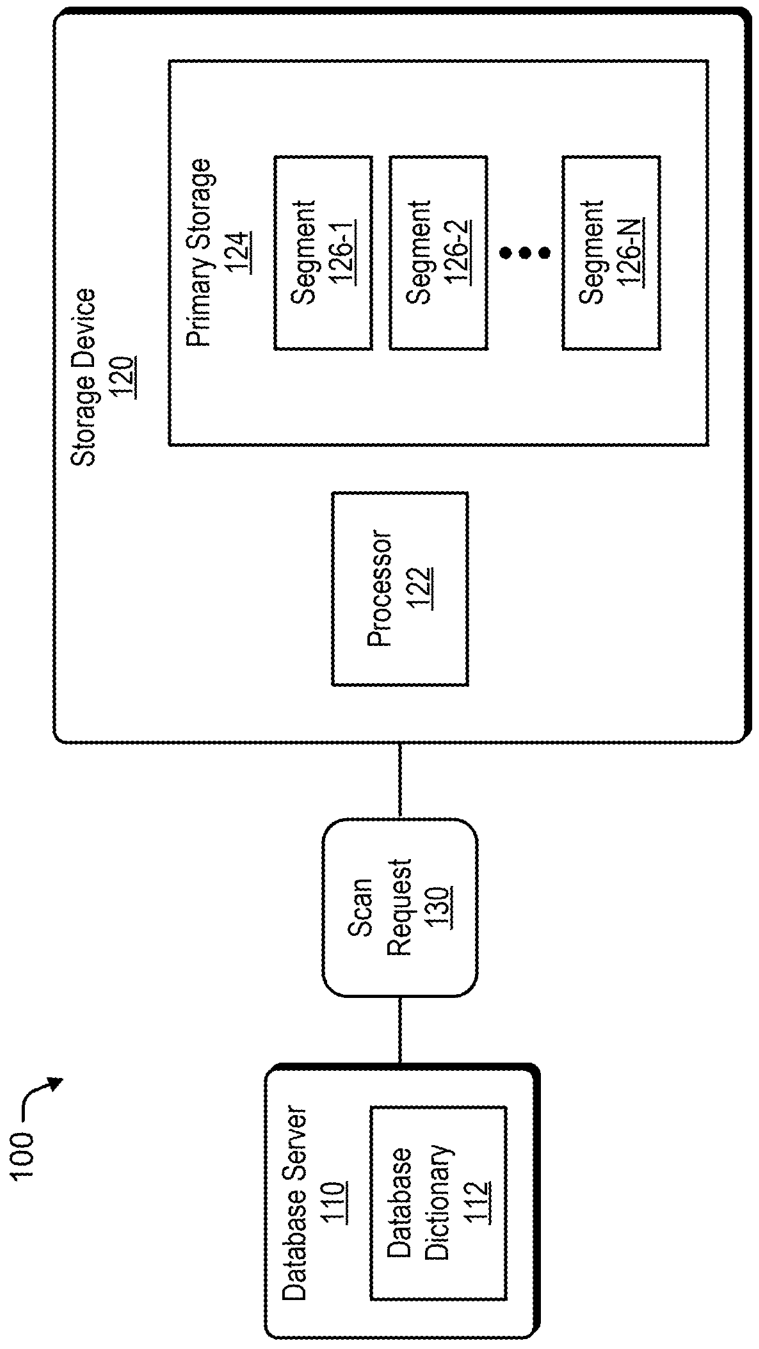
FIG. 1 is a block diagram that depicts a system for scaling logical partitioning with physical key organization according to an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The illustrative embodiments enhance scalability of table partitioning by providing partitioning at two levels. A first level is implemented within the "database layer" and is referred to herein as partitioning at the logical level. Within the database layer, a database dictionary of a database management system (DBMS) defines each partition of the table and the partitioning key by which to partition the table into partitions. For each partition, the database dictionary also identifies a segment for storing database data for the partition. Partitions defined by a database dictionary at the first level of partitioning are referred to logical partitions.

A segment comprises one or more sets of data blocks (extents) that are stored across one or more database files in the storage layer on a storage device. In an embodiment, an extent is stored within a single database file. A segment includes an initial extent that also includes a mapping to other extents that belong to the segment, if any. A segment may be labeled by, for example, a segment identifier "ID". A segment may also be identified by a database file and offset ("segment offset") that references the initial extent of the segment. A database dictionary may identify a segment by storing metadata that includes a segment ID and/or segment offset in association with a partition.

According to an embodiment, a "base" segment may include child segments referred to as subsegments. Like a segment as previously described, a subsegment includes an initial extent, which includes a mapping to other extents of the subsegment. A base segment also includes a mapping of any subsegments the segment contains, each of which may be identified by segment offset to the subsegment. While a base segment contains a mapping of subsegments, a base segment does not contain a direct mapping of the extents of subsegments.

The second level of partitioning further partitions a base segment into subsegments by partition key. The mapping of subsegments in the base segment maps a subsegment to a partition key value. For example, a database dictionary may define a partition for rows having partition key values in the range of 1-100. The database dictionary further defines a base segment for storing rows of the partition. Rows having a particular key value in the range are stored in a separate subsegment of the base segment. A mapping in the base segment maps each partition key value to a respective subsegment.

A Key-Organized Table (KOT) is a table that is organized into subsegments based on a partition key defined by a database dictionary. In an approach that exploits a KOT, logical partitions are defined in the database layer by a database dictionary. The logical partitions are further partitioned at the storage layer by a storage device into subsegments based on partition key values. The mapping of the partition key values to subsegments is tracked by a base segment in a subsegment summary, such as at least one Subsegment Summary Block (SSB). Each SSB entry stores a key, and each subsegment represents only a corresponding key in a SSB entry.

Partitioning at the subsegment level is referred to herein as partitioning at the physical level. Physical level partitioning is performed by a storage device transparently to the database layer. The database dictionary does not directly map any partitioning key value to any subsegment.

The number of logical partitions that need to be defined can be significantly reduced at the database layer by using coarser-grain partitioning. Finer-grain partitioning can be left to the storage layer that organizes rows into subsegments based on the partitioning key. Finer-grain partition can be exploited by storage servers service scan requests by "pruning subsegments" that can be ignored for scanning. The subsegments are created and managed at the storage layer, are transparent to a database server in the database layer. There may be no data definition language (DDL) statements for defining subsegments. The storage layer may be agnostic to the logical partitioning, and the database layer is agnostic to subsegments. The subsegments are dynamic because the storage layer can create and move data between segments and can also change compression levels on the fly.

Subsegments can be pruned efficiently during runtime without adding complexity to the query plan. The database server can employ pruning based on partition key values. For example, if a query only touches certain partitions out of many partitions, the database server sends a table scan that the storage device typically only performs on the segments that correspond to the certain partitions. Thus, irrelevant data can be pruned, such as filtered out, at a high level by the database server. With a KOT, irrelevant data is further filtered out at a lower level by the storage device.

Metadata for subsegments is fully contained at the storage device in the base segments. The storage device can then scan segments of a table and make pruning decisions of subsegments without consulting catalog tables, such as a database dictionary, to locate the segment offset or other information from parts and subparts of the database dictionary.

For example, when a query comes in, one step of cursor compilation is to consult the database dictionary. The database dictionary maps a partition to a segment offset of a segment that stores rows for the partition. The cursor is compiled numerous times when a query touches numerous partitions or the information is in the cursor a numerous amount of times. With KOT, the storage device may only scan the subsegment corresponding to the predicate key, which is more efficient than consulting the database dictionary for every subsegment. This reduces the number of cursor compilations and reduces the information in the cursor, which improves database system operation.

Database users can continue to use their existing partitioning schemes even as datasets explode in size. The difference is that the partitions can be much coarser grained, i.e., include many keys within the same partition, at the database layer, without sacrificing the ability to effectively prune data during queries. The user and the database layer are unaware of subsegments. The database server performs coarse-grained partitioning at the logical partitioning level, and the storage device performs fine-grained partitioning using subsegments at the physical partitioning level. Thus, the KOT achieves improved database performance by using fewer logical partitions at the database layer.

System Architecture

FIG. 1 is a block diagram that depicts a system 100 for scaling logical partitioning with physical key organization according to an example embodiment. The system 100 can be a Database Management System (DBMS), such as a relational DBMS. The system 100 includes a database server 110 and a storage device 120. For the purpose of explanation, FIG. 1 depicts one database server 110 and one storage device 120; however, various embodiments may include any number of database servers 110 and any number of storage devices 120. The database server 110 includes a database dictionary 112. The storage device 102 includes at least one processor 122 and at least one primary storage 124. The primary storage 124 is persisted storage that can be a disk, flash, or other persistent storage. The primary storage 124 includes segments 126-1-126-N.

Database Server

The database server 110 may be configured to communicate with the storage device 120 and to execute client applications. An example of the database server 110 is a multi-node database server, with each node running an instance of a database server and having shared access to the storage device 120. The database server 110 may be configured to request data from storage device 120, receive data from storage device 120, send data to storage device 120, and otherwise communicate with storage device 120.

Database Dictionary and Partitions

The database server 110 includes a database dictionary 112. The database dictionary 112 stores metadata about database objects. For example, the database dictionary 112 defines tables, columns, data types, constraints, and other database objects. The database dictionary 112 contains enough information, such as segment ID, segment offset, and/or other information, to locate a segment 126 stored in the storage device 120.

A table can correspond to one segment 126 on the storage device 120. Also, or alternatively, the table includes a partition key column by which the table is partitioned into a plurality of partitions, where each partition corresponds to a segment 126 on the storage device 120. The database dictionary 112 defines the partition key column and maps said plurality of partitions to respective segments of a plurality of segments 126-1-126-N. The database dictionary 112 maps particular partition key values to respective partitions stored in particular segments.

For example, when a table is partitioned, the database dictionary 112 defines the partitioned table. The database dictionary 112 has metadata defining the partitions. The metadata can include partition identifiers, the key values of partitions, the segment identifier and segment offset associated with the partition, and other information. The key values of a partition can include the range boundaries, list values, and other forms of allocating particular key values to the partition. The segment identifiers refer to the segments 126 on the storage device 120. Thus, the database dictionary 112 provides a mapping from partitions of a table to corresponding segments 126 on the storage device 120. Typically, each table partition on the database dictionary 112 is stored in a segment 126 on the storage device 120.

Storage Device

The storage device 120 can also be considered a storage server. Primary storage 124 on the storage device 120 can include a tablespace, segments, extents, datafiles, and data blocks, all of which are not shown for simplicity. Extents are logically part of a segment but are physically stored in a datafile. The datafiles and data blocks are physical storage units on media, such as disk or flash media. An extent may be contiguously stored (within an address space) set of blocks. An extent is logically part of a segment and physically stored in a datafile. A datafile stores the actual data blocks that make up extents. A data block is the smallest unit of Input/Output (I/O). A data block is stored in datafiles and grouped into extents.

In an embodiment, the storage device 120 is an enhanced storage device. An enhanced storage device is a storage device configured to work cooperatively with the database server 110 and to provide filtered and unfiltered data blocks to the database server 110. An enhanced storage device may perform some filtering of the data in the data blocks based on filtering criteria provided by the database server. An enhanced storage device may be equipped with modules configured to determine compression formats, evaluate costs associated with sending data to the storage server, and perform selectivity of each predicate.

In managing data storage, an enhanced storage device may utilize metadata stored in each data block, referred to as data block metadata. The data block metadata within a data block may, for example, indicate where each column within the data block begins. In addition, the data block metadata may contain control information for database transactions, and a token table used for compressing the data block.

Partitions and Segments

As discussed above, for partitioned tables, each partition is stored as a separate segment 126 on the storage device 120, where a segment is a collection of extents allocated for a specific object, and where an extent is a logical unit of database storage space allocation. One or more extents, in turn, make up a segment. The first block of the initial extent of a segment contains the segment header that includes metadata, including an extent mapping with pointers to extents of the segment. When the database server 110 needs to scan or access a partition, it does so by referencing the segment associated with that partition.

Scan Request

The storage device 120 is configured to manage receiving, storing and retrieving data. For example, the database server 110 executes a database statement against a table defined by the database dictionary 112. The database statement specifies a predicate that filters based on a particular partition key value. When executing the statement, the database server 110 prunes a plurality of table partitions based on the predicate to select a particular partition, such as a partition that includes the particular partition key value. The database server 110 sends to the storage device 120 a scan request 130 that specifies to scan the particular segment for rows that satisfy the predicate. The scan request 130 can include the particular partition key value.

Thus, the storage device 120 receives scan requests from the database server 110. The storage device 120 receives the scan request 130 from the database server 110 to retrieve particular data blocks from the storage device 120. The database server 110 typically only knows about segments and can only make scan requests on the segment level. In an embodiment, the database server 110 sends the scan request 130 in the form of a smart scan request to the storage device 120. The smart scan request specifies the segment by, for example, segment offset and one or more filtering criteria. The smart scan request can be considered a filtered data block request that asks for data blocks filtered based on a particular column and column value.

For example, the database server 110 issues the smart scan request to request data blocks that have only the rows that are filtered according to one or more filtering criteria. In response, the storage device 120 retrieves the data blocks from the primary storage 124, filters rows in the data blocks, and returns the data blocks containing only the rows that satisfy the filtering criteria. The smart scan request capability enables system 100 to offload portions of the work of computing a query from the database server 110 to the storage device 120.

For example, the database server 110 can send a smart scan request to the storage device 120, requesting the storage device 120 to scan a segment for information. In an embodiment, the segment is the lowest level of granularity that the database server 110 can send for a scan request. If a query asks for all rows for a particular partition key value, the database server 110 may know one partition that stores that partition key value if the partitions are partitioned on the value. The database server 110 can prune segments of the other partitions and send the scan request only for the partition segment that contains the partition key value. The database server 110 may also know the data file, as well as an offset, for the segment, which it can include in the scan request to inform the storage device 120 of the data file for the segment. The database server 110 can only make scan requests at the segment level because the database server 110 only knows what the segment is for a given partition from the database dictionary 112. Thus, the scan requests are made by the database server 110 at the segment level. Upon receiving the scan request 130 the storage device 120 scans the whole identified segment for the partition key value.

SSB and Subsegments

Figure 2:
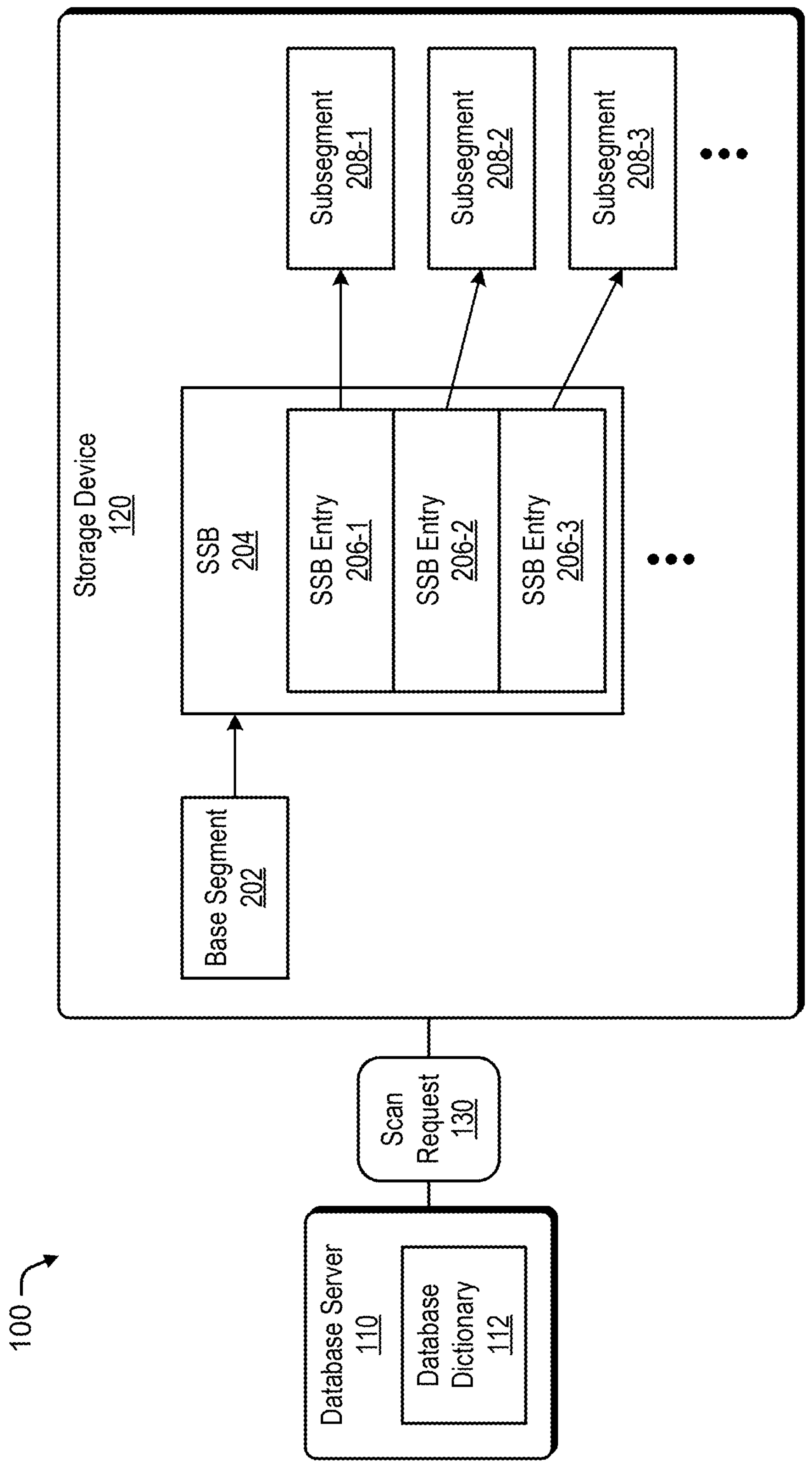
FIG. 2 is a block diagram of the system according to a possible embodiment.

FIG. 2 is a block diagram of the system 100 according to a possible embodiment. As discussed above, the system 100 includes the database server 110, the database dictionary 112, and the storage device 120. The storage device 120 includes a base segment 202, a subsegment summary 204, and at subsegments 208-1-208-3. For ease of description, the subsegment summary 204 will be referred to as an SSB 204, but the subsegment summary 204 can be one or more segments and/or can include multiple data blocks. The SSB can include SSB entries 204-1-204-3. Three SSB entries 206 and three subsegments 208 are shown for illustrative purposes, but there can be any number of SSB entries 206 and subsegments 208.

Base Segment

The base segment 202 itself can include the SSB 204. Alternatively, instead of containing the SSB 204, the base segment 202 can refer, such as point, to at least one separate segment that includes the SSB 204. The base segment 202 at the storage device 120 has a one-to-one relationship with a partition of a table at the database server 110. In some embodiments, a partition can refer to a sub-partition at a lower level of partitioning of the table. For example, there can be partitions and layers of sub-partitions, where each sub-partition is represented by a base segment. If the table is unpartitioned, the table itself is the logical partition represented by the base segment.

SSB and Subsegment Mapping

Subsegments 208 are physical containers of rows. The subsegments 208 can be dynamically created and dropped while supporting concurrent readers and writers. The storage device 120 includes a mapping that maps partition key values of a partition key column to respective subsegments of a plurality of subsegments of a particular segment, such as subsegments 208 of the base segment 202. In particular, the SSB 204 divides the base segment 202 into subsegments 208. The SSB 204 includes the mapping of partition key values to the subsegments 208. For the mapping, each SSB entry 206 maps a particular key value to a respective subsegment 208. Thus, a key value-to-subsegment mapping can be tracked using physical SSB blocks. This creates a KOT where a table and partitions of a table are defined by the database dictionary 112 at the database server 110, and the partitions are organized by key values in the SSB 204 at the storage device 120.

The subsegments 208 can be dynamically created and dropped while supporting concurrent readers and writers. The subsegments 208 are each stored in at least one segment, and the SSB entries 206 map partition key values to respective segment headers for the corresponding subsegments 208. In a sense, the SSB 204 does additional partitioning of a partition at the database server 110 into the subsegments 208 on the storage device 120. The subsegments 208 correspond to partition key values stored in the SSB 204. Each subsegment 208 can be a segment itself and is referred to as a subsegment because it subsegments a partition into sub-partitions that are each stored in a segment.

The segment for a given subsegment is stored in one or more extents. A header or other metadata extent of a segment can include a mapping to its extents that include the data. The extents of each subsegment 208 can be isolated from the base segment 202 by being referenced by the SSB 204.

Loads can create a new subsegment when a given base segment is large enough and a new partitioning key is detected. For example, a load can be a direct load. A direct load can load multiple rows into a database, such as into a segment. An insert can insert a row into the database, such as into a segment. For example, when a new row arrives, the partition key value, such as the KOT key value, is extracted from the row, and the SSB is searched for the value. An entry matching the extracted key value will be found if the sub-segment has already been created, such as by a previous insert for the same key. If a matching entry is not found, a new entry is recursively created and the SSB is updated. The new row is then inserted directly into the subsegment without staging in the base segment. Any free data block in the sub-segment can be used to store the new row, depending on the availability.

In an embodiment, the database dictionary 112 does not directly map any portion of partition key values at the subsegment level. In particular, at the partition level, the database dictionary 112 includes a mapping of partition key values to base segments, such as the base segment 202. However, at the subsegment level, the database dictionary 112 does not include the mapping between partition key values and subsegments 208. Instead, the SSB 204 at the storage device 120 maps partition key values to subsegments 208.

Parent and Child Subsegments

In an embodiment, subsegments 208 can be parent subsegments that include their own SSB with pointers to child subsegments, such as sub-subsegments that are each stored in a segment. For example, the storage device 120 has the flexibility to determine if further transparent subsegmenting is beneficial, such as based on size, workload, table type, and other factors. There can be multiple levels of parent and child subsegments, where a child subsegment can be a parent of further child subsegments. To elaborate, the base segment 202 can have an SSB that is a catalog that has pointers to subsegments. Each subsegment can have its own SSB that points to sub-subsegments. In one example, data can be directly loaded into child subsegments. In another example, child subsegments can be compressed into parent subsegments, and the child subsegments can be dropped.

Scan Request

As discussed above, the database server 110 executes a database statement against a table defined by the database dictionary 112. The table includes a partition key column by which the table is partitioned into a plurality of partitions. The database dictionary 112 defines the partition key column and maps the plurality of partitions to respective base segments, such as base segment 202. The database statement specifies a predicate that filters based on a particular partition key value. The database dictionary 112 maps the particular partition key value to a partition stored in the base segment 202.

The storage device 120 includes a mapping that maps partition key values of said partition key column to respective subsegments of a plurality of subsegments 208 of the base segment. For example, the SSB entries include partition key values, and the SSB 204 maps the SSB entries 206 to respective subsegments 208.

To execute the database statement, the database server 110 prunes the plurality of partitions based on the predicate to select a particular partition. The database server 110 sends, to the storage device 120, a scan request 130 that specifies to scan the base segment 202 for rows that satisfy the predicate. For example, the scan request 130 from the database server 110 identifies, such as points to, a base segment 202 on the storage device 120. The storage device 120 prunes the subsegments 208 to select a particular subsegment. For example, if the SSB entry 206-2 includes the particular partition key value, the storage device 120 prunes the subsegments 208-1 and 208-3 based on partition key values in the SSB entries 206 to select the particular subsegment 208-2 that includes the particular partition key value. The storage device 120 scans the particular subsegment 208-2 and returns rows from the particular subsegment 208-2 as results for the scan request.

To elaborate, the database server sends the scan request 130 that indicates a segment and a predicate partition key value. If the table is partitioned, the segment indicated in the scan request 130 corresponds to a partition of the table at the database server 110. If subsegments exist at the storage device 120, the segment in the smart scan corresponds to a base segment 202. Based on the scan request 130, the storage device 120 accesses the base segment 202, plus all subsegments that qualify based on the partition key value. For example, when generating an extent map with results for the scan request 130, the storage device 120 includes only extents from subsegments that match the partition key value. Subsegments can be dropped while queries or DMLs are in-flight. For example, a data lake cache might age out a file.

For example, the scan request 130 includes the segment and the predicate value. The scan request 130 can request all rows with a particular predicate value. The storage device 120 receives the scan request 130 and can use the mapping in the SSB 204 to identify that the value is stored in a particular subsegment and to prune the unrelated segments from the returned results. Subsegments pruning is done by offloading query predicates on the segmenting key to the extent map generation by the storage device 120. The extents from subsegments that pass the key filters are included in the final extent map for the table scan.

Hierarchy

Figure 3:
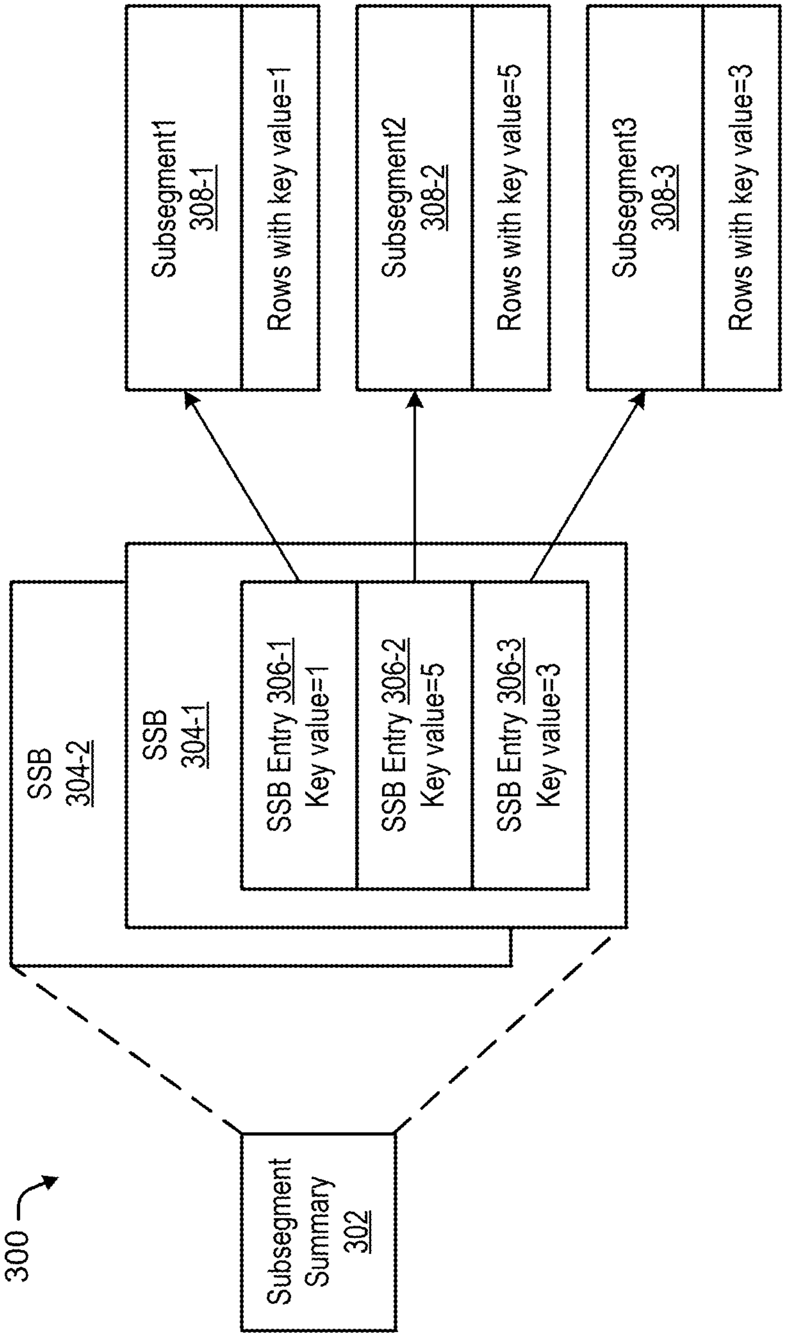
FIG. 3 is an example illustration of a hierarchy of a Key-Organized Table (KOT) according to an example embodiment.

FIG. 3 is an example illustration of a hierarchy 300 of a KOT according to an example embodiment. The hierarchy includes a subsegment summary 302. The subsegment summary 302 includes at least one SSB 304-1 and 304-2. Each SSB includes SSB entries with key values. For example, SSB 304-1 includes SSB entry 306-1 with a key value=1, SSB entry 306-2 with a key value=5, and SSB entry 306-3 with a key value=3. The entries 306 point to subsegments 308-1-308-3 that each store rows with respective key values. In a KOT, the table is key organized by key values, where segments of the table are organized by key. This can also be considered transparent partitioning, which uses subsegments for additional partitioning in a manner that is transparent to a database server.

For example, a KOT in a DBMS is a type of table where the rows are stored in a sorted order based on the primary key, which speeds up searches and range queries. Without a KOT, a table can have 32k partitions, where each partition corresponds to a subsegment that is 512 MB. A KOT can reduce the number of partitions. For example, the KOT can reduce the number of partitions from 32k down to 32 partitions at the database server. The storage device can include multiple subsegments per table partition. For example, the storage device can have 1k subsegments per table partition for a total of 32k subsegments, where each subsegment can be 512 MB. Thus, the KOT can reduce the number of partitions from 32k down to 32 partitions with 1k subsegments per partition.

Offloading Query Predicates to the Extent Map Generation

Figure 4:
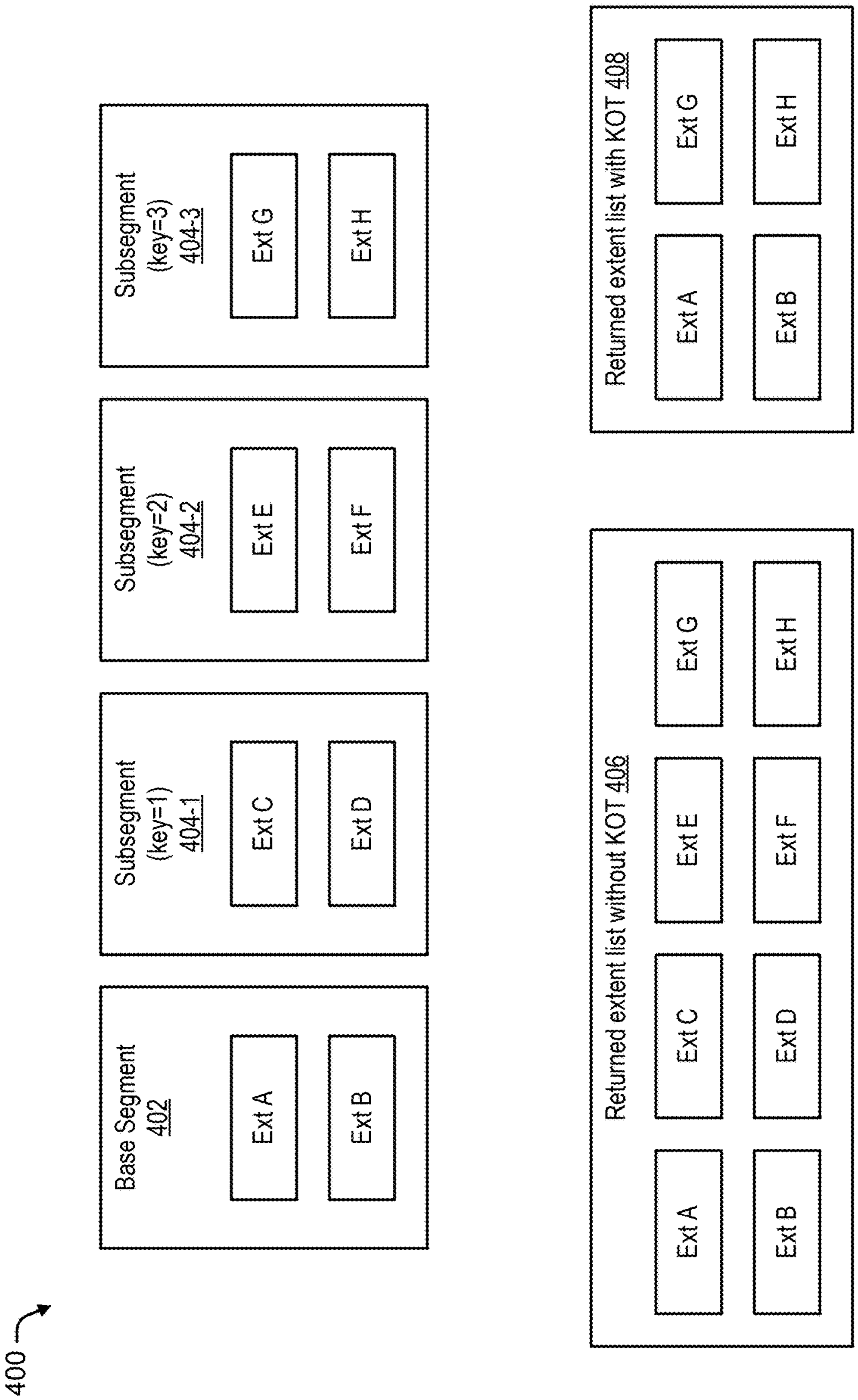
FIG. 4 is an example illustration of offloading query predicates to extent map generation according to a possible embodiment.

FIG. 4 is an example illustration 400 of offloading query predicates to extent map generation according to a possible embodiment. The illustration shows a base segment 402, subsegment 404-1 corresponding to a partition key value of 1, subsegment 404-2 corresponding to a partition key value of 2, and subsegment 404-3 corresponding to a partition key value of 3. The subsegments 404-1-404-3 each include respective extents that include rows with the respective partition key values.

The base segment 402 can also include extents. For example, transparent partitioning in the KOT may require each subsegment to contain only rows for a single key, which could result in space wastage when the number of rows per unique key is small. To avoid wasted space and subsegments including only one row, new rows can be inserted into the base segment and the creation of corresponding subsegments can be deferred until sufficient rows, such as a threshold number of rows, have been inserted for a key. Alternatively, for simpler operation, the rows can always go directly into subsegments without any rows being placed in the base segment 402.

In operation, the following example information is received in a scan by a storage device:

select count(*) from <table> where KEY=3

The storage device checks a subsegment summary of the base segment 402, determines that the key exists in subsegment 404-3, and determines that subsegments 404-1 and 404-2 with respective keys 1 and 2 can be skipped entirely. The storage device then scans the subsegment 404-3 with key=3. If there are extents in the base segment, such as extents A and B in the base segment 402, then those extents are also returned because rows in the corresponding data blocks of the extents A and B can have mixed KOT key values, and the extents A and B may have rows with key=3. Without KOT, the upper layer at the database server has to scan all the extents A-H in a corresponding returned extent list 406. With KOT, the upper layer only has to scan extents A and B from the base segment 402 and extents G and H from the subsegment 404-3 with key=3 in the returned extent list 408 without even knowing the existence of the subsegments 404.

Results

The KOT with subsegments and corresponding pruning at a storage device can improve database operation by reducing query compilation and cursor management overhead. With coarser-grained partitioning and finer-grained subsegments, such as fewer partitions that include subsegments, fewer entries are created in the system catalog table, such as a database dictionary. There is less work needed to read the catalog table to compile the cursor, and there are less cursors to maintain, which results in more efficient processor operation. Otherwise, numerous partitions cause large overhead when referencing the catalog table for many partitions for cursor compilation.

The KOT can also maximize I/O throughput. For example, one requirement of a high-performance DBMS is that reads and writes should never block each other. To implement this requirement, the DBMS may require an I/O subsystem to perform object-level consistency checks. For example, with object-level consistency checks, when the database server reads an object and checks the corresponding block, the database server checks whether a block belongs to an object because the data may be changing as it is being read. In this context, the object is the partition or segment. Since the check is at the partition/segment level, the I/O subsystem may require that all requests for one partition/segment be served before any requests for other objects can be issued. This can potentially result in poor performance when the query/DML spans multiple partitions. Smaller partitions result in more partitions, and DMLs will more likely span multiple partitions. Transparent partitioning using subsegments addresses this problem by encouraging the use of fewer and larger traditional partitions, thus making it more likely for scans and DMLs to only access one partition.

The KOT can be used with various applications, such as Inverted File Flat (IVF) vector indexes, torrent time series streaming, large iceberg tables, and other applications that would otherwise use numerous partitions.

IVF

IVF works by partitioning a vector space into clusters, allowing searches to be performed efficiently within a subset of these clusters rather than the entire dataset. Accurate vector indexes, such as IVF, require a large number of centroid partitions to improve the recall rate, because a vector index is more accurate with more partitions. With partitioning alone, centroids are stored in partitions, such as range or hash-based partitions. Scanning 32k partitions is 6×slower than scanning 1k partitions. With a KOT, a new subsegment is created to store rows with the same centroid_id. Subsegments are pruned efficiently when there are predicates on centroid_id. In a 32k-subsegment prototype, query time improved by up to 7×.

Torrent Time Series Streaming

Time series streaming involves the real-time processing and analysis of time series data, which is data points collected or recorded at specific time intervals. High volume time series torrents require a large number of metric sub-partitions, where millions of time series are generated per hour into 512 metric sub-partitions, where each time series represents a stream of timestamped data points. Data from high-volume time series with frequent activity can bury low-volume time series with less activity.

Partitioning alone cannot afford unique partitions on millions of time_series_ids with range and hash partitioning. Also, hash sub-partition is not an ideal way to co-locate rows with the same time_series_id. Furthermore, there are expensive dictionary and hard parse costs with a large number of partitions. For example, the dictionary cost refers to the overhead associated with accessing and managing the metadata stored in the system catalog tables. These tables contain information about database objects, including partitions. Many partitions increase the dictionary cost because the database must read and process more metadata entries. The hard parse cost occurs when a SQL statement is parsed for the first time or when it cannot find an exact match in the shared pool. During a hard parse, the database server must allocate memory, check syntax and semantics, and generate an execution plan from scratch. The hard parse cost is higher with numerous partitions because the database server must consider all partitions when generating an execution plan, leading to more complex and time-consuming parsing operations.

KOT gives the option to have one subsegment for each time_series_id. KOT can also give guaranteed data co-location within the same segment. It is less expensive to sort data in subsegments, because there is less processing and less I/O expense due to processing and I/O of less data in selected subsegments instead of all the data in a partition. KOT also allows for the efficiency of dropping a subsegment for a single time_series_id.

Iceberg Table

An Iceberg table refers to a type of large-scale, high-performance table format used in big data systems, particularly in PB-sized data lakes. An iceberg requires a large number of file partitions to cache a subset of the data. Parquet files are cached by importing external data into a table. The Parquet files should be loaded and evicted in a space-efficient manner. For example, the iceberg table creates millions of partitions that each map to a Parquet file. This number of partitions is excessively large. It is also difficult to quickly and efficiently drop Parquet files.

With partitioning alone, one partition for each cached Parquet file is not affordable, such as for 500 MB Parquet files, millions of Parquet files, and 10PB data lake. Also, copy-on-write (due to DMLs) or aging-out of a Parquet file impacts all rows of the file. which causes expensive row updates and deletes in partitions and which results in heap segment becoming fragmented over time.

With KOT, data from Parquet files is key-organized by a file$name column. KOT allows compartmentalization of Parquet files in separate subsegments, which makes it efficient to update or delete rows for a single Parquet file. Furthermore, the compartmentalization results in fragmentation of a subsegment not causing as much overall space wastage and performance impact. For example, with KOT, the files can be deleted quickly, key by key, and corresponding subsegments can be dropped instead of deleting data row by row, which results in better performance. To elaborate, each Parquet file is represented by one subsegment, where the key is the file$name. Dropping a Parquet file only requires dropping the corresponding subsegment. Replacing a Parquet file only requires dropping the corresponding subsegment and creating a new subsegment. Using the KOT also results in more efficient memory usage by reducing fragmentation because segments will not have holes from deleted rows. Instead, a file with a subsegment can be deleted, which is cleaner.

Example Methods

Figure 5:
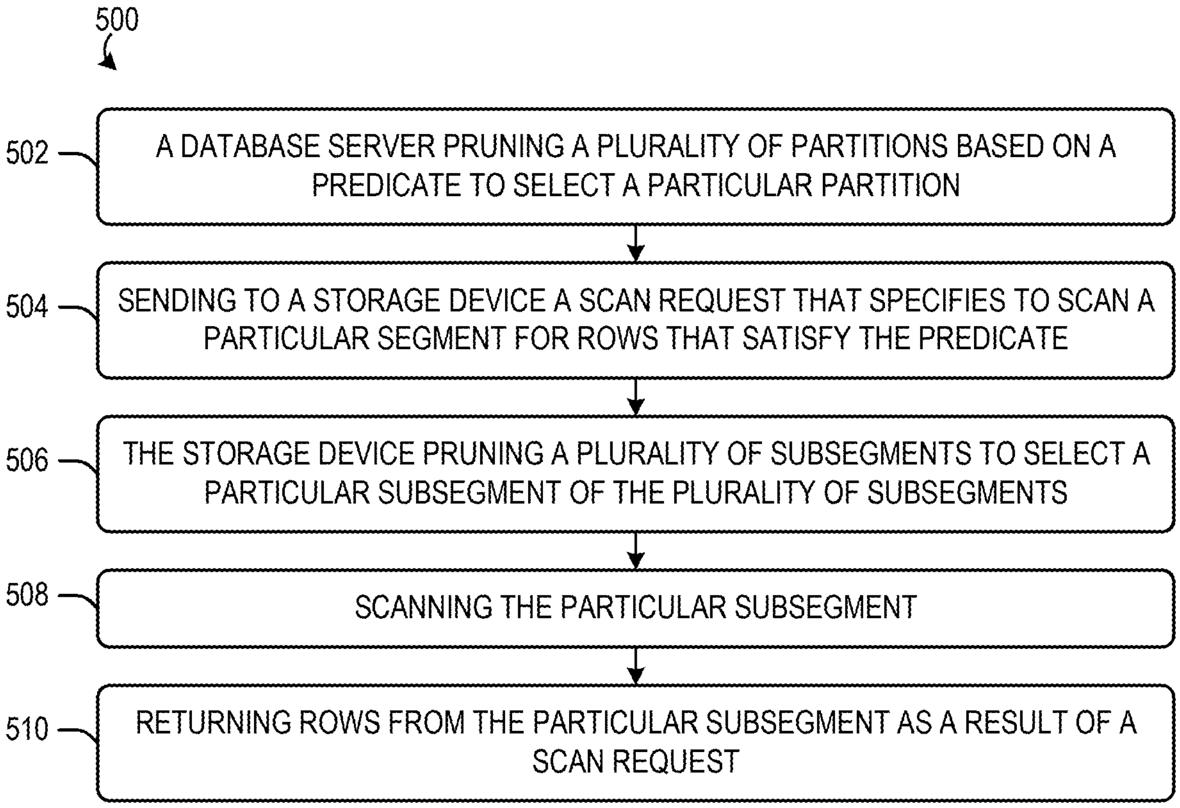
FIG. 5 is a flowchart of a method for scaling logical partitioning with physical key organization according to an example embodiment.

FIG. 5 is a flowchart 500 of a method for scaling logical partitioning with physical key organization according to an example embodiment. The method involves, within a DBMS, a database server executing a database statement against a table defined by a database dictionary. The table includes a partition key column by which the table is partitioned into a plurality of partitions. The database dictionary defines the partition key column and maps the plurality of partitions to respective segments of a plurality of segments. The database statement specifies a predicate that filters based on a particular partition key value. The database dictionary maps the particular partition key value to a partition stored in a particular segment. A storage device of the DBMS includes a mapping that maps partition key values of the partition key column to respective subsegments of a plurality of subsegments of the particular segment.

The flowchart 500 illustrates operations for executing the database statement. At 502, the database server prunes the plurality of partitions based on the predicate to select a particular partition. At 504, the storage device is sent, such as by the database server, a scan request that specifies to scan the particular segment for rows that satisfy the predicate. At 506, the storage device prunes the plurality of subsegments to select a particular subsegment of the plurality of subsegments. At 506, the particular subsegment is scanned, such as by the storage device. At 510, rows from the particular subsegment are returned, such as by the storage device, as a result of the scan request.

According to a possible embodiment, the scan request includes an identifier of the particular segment and includes the particular partition key value. According to another possible embodiment, the database dictionary does not map any portion of the partition key values to the plurality of subsegments. According to a further possible embodiment, the storage device performs the pruning of the plurality of subsegments transparently to the database server. For example, the subsegments are not cataloged at the database server.

According to a possible embodiment, the mapping includes a subsegment summary block that maps the plurality of subsegments to partition key values of the partition key column. According to a possible implementation of this embodiment, rows of the table include partition key values, and wherein the storage device stores rows of the table with specific partition key values in respective specific subsegments.

According to another possible implementation of this embodiment, the storage device stores a respective base segment for each of the plurality of partitions, and a particular base segment corresponds to the subsegment summary block and corresponds to the plurality of subsegments. According to an example of this implementation, the particular base segment includes a header block, the header block includes a pointer to a summary segment, the summary segment includes a plurality of subsegment summary blocks, and the subsegment summary block is one of the plurality of subsegment summary blocks. For example, if SSB has a block size limit and the limit is exceeded, there can be multiple SSBs.

According to another example of this implementation, the storage device loads data corresponding to the table, the data including a new partition key value that is not present in any subsegment summary block. The storage device detects the new partition key value. The storage device creates a new sub-segment based on detecting the new partition key value. According to an embodiment of this example, the storage device determines a size of a base segment exceeds a threshold size value. The storage device creates the new sub-segment based on detecting the new partition key value and based on determining that the size of the base segment exceeds the threshold size value.

Dbms Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a database object marked up in a hierarchical-markup language, such as a JSON object or XML document. The attributes are referred to as JSON fields or XML elements. A relational DBMS may also store hierarchically-marked database objects; however, the hierarchically-marked database objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure database objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snapshot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
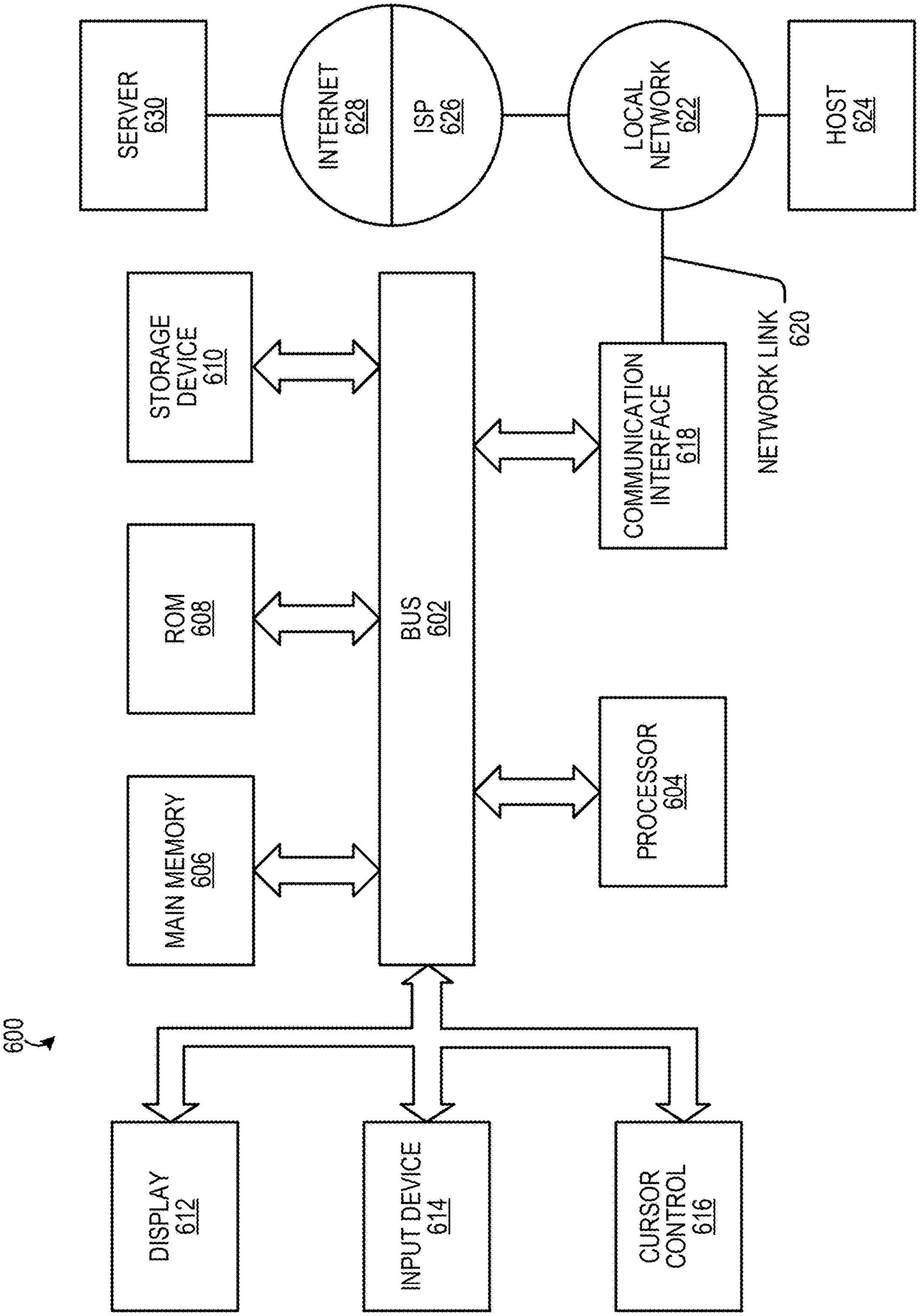
FIG. 6 is a block diagram that illustrates a computer system upon which aspects of the illustrative embodiments may be implemented.

For example, FIG. 6 is a block diagram that illustrates a computer system 600 upon which aspects of the illustrative embodiments may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612 for displaying information to a computer user. An input device 614, including alphanumeric and other keys, is coupled to bus 602 for communicating information and command selections to processor 604. Another type of user input device is cursor control 616, such as a mouse, a trackball, a touch screen, a track pad, and/or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and/or any other storage media.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem or send the instructions using a network. A receiver, such as a modem, local to computer system 600 can receive the data and use, for an example, an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented, such as to a wireless local area network (WLAN) or to a cellular network. In any such implementation, communication interface 618 sends and receives electrical, electromagnetic, radio, optical, and/or other signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
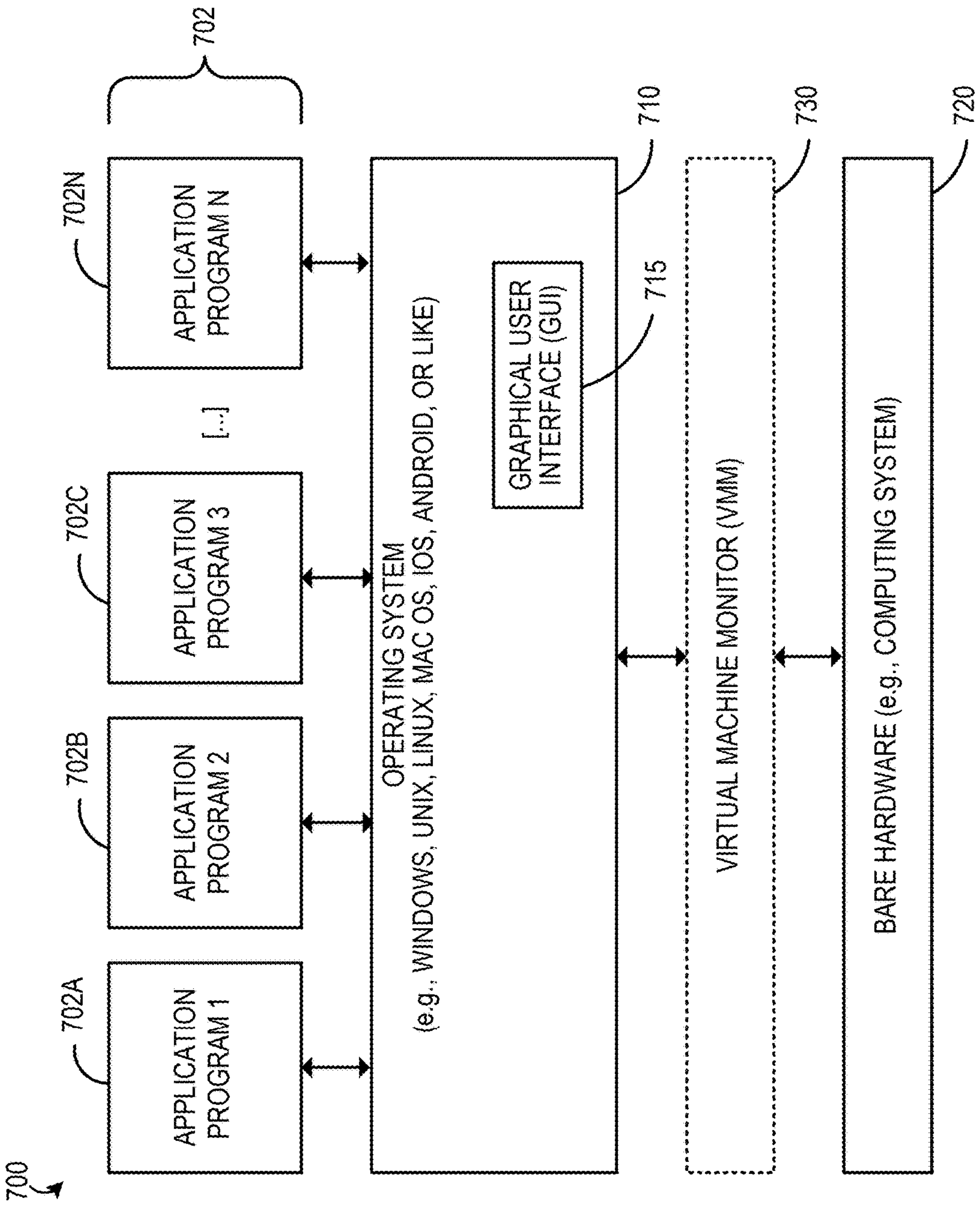
FIG. 7 is a block diagram of a basic software system that may be employed for controlling the operation of the computer system according to an example embodiment.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising within a DBMS, a database server executing a database statement against a table defined by a database dictionary, wherein said table includes a partition key column by which said table is partitioned into a plurality of partitions, wherein said database dictionary defines said partition key column and maps said plurality of partitions to respective segments of a plurality of segments, wherein said database statement specifies a predicate that filters based on a particular partition key value, wherein said database dictionary maps said particular partition key value to a partition stored in a particular segment, wherein a storage device of said DBMS includes a mapping that maps partition key values of said partition key column to respective subsegments of a plurality of subsegments of said particular segment;

wherein executing said database statement includes:

said database server pruning said plurality of partitions based on said predicate to select a particular partition;

sending to said storage device a scan request that specifies to scan said particular segment for rows that satisfy said predicate;

said storage device pruning said plurality of subsegments to select a particular subsegment of said plurality of subsegments;

scanning said particular subsegment;

returning rows from said particular subsegment as a result of said scan request.

2. The method of claim 1, wherein said database dictionary does not map any portion of said partition key values to said plurality of subsegments.

3. The method of claim 1, wherein said mapping includes a subsegment summary block that maps said plurality of subsegments to partition key values of said partition key column.

4. The method of claim 3, wherein rows of said table include partition key values, and wherein said storage device stores rows of said table with specific partition key values in respective specific subsegments.

5. The method of claim 3, wherein said storage device stores a respective base segment for each of said plurality of partitions, wherein a particular base segment corresponds to said subsegment summary block and corresponds to said plurality of subsegments.

6. The method of claim 5, wherein said particular base segment includes a header block, wherein said header block includes a pointer to a summary segment, wherein said summary segment comprises a plurality of subsegment summary blocks, and wherein said subsegment summary block is one of said plurality of subsegment summary blocks.

7. The method of claim 5, further comprising said storage device:

loading data corresponding to said table, said data including a new partition key value that is not present in any subsegment summary block;

detecting said new partition key value; and creating a new sub-segment based on detecting said new partition key value.

8. The method of claim 7, further comprising said storage device:

determining a size of a base segment exceeds a threshold size value; and creating said new sub-segment based on detecting said new partition key value and based on determining said size of said base segment exceeds said threshold size value.

9. The method of claim 1, wherein said scan request includes an identifier of said particular segment and includes said particular partition key value.

10. The method of claim 1, wherein said storage device performs said pruning said plurality of subsegments transparently to said database server.

11. One or more non-transitory storage media storing one or more sequences of instructions which, when executed by one or more computing devices, cause:

within a DBMS, a database server executing a database statement against a table defined by a database dictionary, wherein said table includes a partition key column by which said table is partitioned into a plurality of partitions, wherein said database dictionary defines said partition key column and maps said plurality of partitions to respective segments of a plurality of segments, wherein said database statement specifies a predicate that filters based on a particular partition key value, wherein said database dictionary maps said particular partition key value to a partition stored in a particular segment, wherein a storage device of said DBMS includes a mapping that maps partition key values of said partition key column to respective subsegments of a plurality of subsegments of said particular segment;

wherein executing said database statement includes:

said database server pruning said plurality of partitions based on said predicate to select a particular partition;

sending to said storage device a scan request that specifies to scan said particular segment for rows that satisfy said predicate;

said storage device pruning said plurality of subsegments to select a particular subsegment of said plurality of subsegments;

scanning said particular subsegment;

returning rows from said particular subsegment as a result of said scan request.

12. The one or more non-transitory storage media of claim 11, wherein said database dictionary does not map any portion of said partition key values to said plurality of subsegments.

13. The one or more non-transitory storage media of claim 11, wherein said mapping includes a subsegment summary block that maps said plurality of subsegments to partition key values of said partition key column.

14. The one or more non-transitory storage media of claim 13, wherein rows of said table include partition key values, and wherein said storage device stores rows of said table with specific partition key values in respective specific subsegments.

15. The one or more non-transitory storage media of claim 13, wherein said storage device stores a respective base segment for each of said plurality of partitions, wherein a particular base segment corresponds to said subsegment summary block and corresponds to said plurality of subsegments.

16. The one or more non-transitory storage media of claim 15, wherein said particular base segment includes a header block, wherein said header block includes a pointer to a summary segment, wherein said summary segment comprises a plurality of subsegment summary blocks, and wherein said subsegment summary block is one of said plurality of subsegment summary blocks.

17. The one or more non-transitory storage media of claim 15, wherein the instructions, when executed by the one or more computing devices, further cause said storage device:

loading data corresponding to said table, said data including a new partition key value that is not present in any subsegment summary block;

detecting said new partition key value; and creating a new sub-segment based on detecting said new partition key value.

18. The one or more non-transitory storage media of claim 17, wherein the instructions, when executed by the one or more computing devices, further cause said storage device:

determining a size of a base segment exceeds a threshold size value; and creating said new sub-segment based on detecting said new partition key value and based on determining said size of said base segment exceeds said threshold size value.

19. The one or more non-transitory storage media of claim 11, wherein said scan request includes an identifier of said particular segment and includes said particular partition key value.

20. The one or more non-transitory storage media of claim 11, wherein said storage device performs said pruning said plurality of subsegments transparently to said database server.

* * * * *